(12) United States Patent
Kim et al.

(10) Patent No.: US 12,482,120 B2
(45) Date of Patent: Nov. 25, 2025

(54) INTERACTION SYSTEM BETWEEN INFRASTRUCTURE AND MULTIPLE MOVING OBJECTS THROUGH SENSOR FUSION BASED INTERSECTION 3D SPACE CREATION AND INTERACTION METHOD USING THE SAME

(71) Applicant: ELECTRONICS AND TELECOMMUNICATIONS RESEARCH INSTITUTE, Daejeon (KR)

(72) Inventors: JinWoo Kim, Daejeon (KR); Ki Tae Kim, Daejeon (KR); MyungWook Park, Daejeon (KR); Kyoung Hwan An, Daejeon (KR); Jeong Dan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 205 days.

(21) Appl. No.: 18/367,590

(22) Filed: Sep. 13, 2023

(65) Prior Publication Data

US 2024/0087225 A1   Mar. 14, 2024

(30) Foreign Application Priority Data

Sep. 14, 2022 (KR) .................. 10-2022-0115535
Oct. 28, 2022 (KR) .................. 10-2022-0140846

(51) Int. Cl.
  *G06T 17/05* (2011.01)
  *G06T 7/20* (2017.01)
  (Continued)

(52) U.S. Cl.
  CPC .................. *G06T 7/55* (2017.01); *G06T 7/20* (2013.01); *G06T 7/50* (2017.01); *G06T 17/00* (2013.01);
  (Continued)

(58) Field of Classification Search
  CPC .. G06T 7/55; G06T 7/50; G06T 17/00; G06T 3/18; G06V 20/58; G06V 20/653; G06V 2201/07
  See application file for complete search history.

(56) References Cited

U.S. PATENT DOCUMENTS 9,288,635 B2   3/2016   Yoo et al.
9,367,065 B2   6/2016   Dolgov et al.
(Continued)

FOREIGN PATENT DOCUMENTS

JP          6354556 B2 *   7/2018
KR   10-2020-0073435 A    6/2020
(Continued)

OTHER PUBLICATIONS

Taragay Oskiper, et al., "Multi-modal_Sensor_Fusion_Algorithm_for_Ubiquitous Infrastructure-free Localization in Vision-impaired Environments", The 2010 IEEE/RSJ International Conference on Intelligent Robots and Systems, Oct. 18, 2010.
(Continued)

*Primary Examiner* — Terrell M Robinson
(74) *Attorney, Agent, or Firm* — LRK PATENT LAW FIRM (57) ABSTRACT

The interaction system includes: an infrastructure image sensor-based 3D cloud restoration module configured to create a 3D cloud point using a multi-view image received from an infrastructure sensor; a real-time 3D map creation and learning update module configured to generate subset data composed of point clouds into a 3D map using 3D point
(Continued)

information received from the infrastructure image sensor-based 3D cloud restoration module; an object estimation module in a 3D space configured to recognize and track an object existing in a 3D space based on the 3D map received from the real-time 3D map creation and learning update module; and a dangerous situation recognition and interaction module in space configured to receive information on an object existing in the 3D space from the object estimation module in the 3D space, recognize a dangerous situation, and provide dangerous situation related information.

6 Claims, 6 Drawing Sheets

(51) Int. Cl.
| | | |
|---|---|---|
| *G06T 7/50* | (2017.01) | |
| *G06T 7/55* | (2017.01) | |
| *G06T 17/00* | (2006.01) | |
| *G06V 10/44* | (2022.01) | |
| *G06V 20/58* | (2022.01) | |
| *G06V 20/64* | (2022.01) | |
| *G06T 3/18* | (2024.01) | |
| *G06V 20/52* | (2022.01) | |

(52) U.S. Cl.
CPC .............. *G06V 10/44* (2022.01); *G06V 20/58* (2022.01); *G06V 20/653* (2022.01); *G06T 3/18* (2024.01); *G06T 17/05* (2013.01); *G06T 2207/10028* (2013.01); *G06T 2207/30261* (2013.01); *G06T 2210/61* (2013.01); *G06V 20/52* (2022.01); *G06V 2201/07* (2022.01)

(56) References Cited

U.S. PATENT DOCUMENTS

| | | |
|---|---|---|
| 10,235,885 B2 | 3/2019 | An et al. |
| 2013/0223686 A1* | 8/2013 | Shimizu ................. G06T 7/246 |
| | | 382/103 |
| 2017/0161410 A1* | 6/2017 | Mizuta .................... G06F 30/20 |
| 2020/0079504 A1* | 3/2020 | Hieida ................. G01C 21/005 |
| 2020/0250974 A1* | 8/2020 | Kim ........................ G06V 10/82 |
| 2022/0371614 A1* | 11/2022 | Gyllenhammar ..... G06F 18/217 |

FOREIGN PATENT DOCUMENTS

| | | | | |
|---|---|---|---|---|
| KR | 20200073435 A | * | 6/2020 | ............ G06T 15/06 |
| KR | 10-2021-0018434 A | | 2/2021 | |
| KR | 10-2334177 B1 | | 12/2021 | |

OTHER PUBLICATIONS

Lawrence Klein, "Sensor and Data Fusion for Intelligent Transportation Systems", ResearchGate, Book, Jul. 8, 2019.

* cited by examiner

FIG. 3

INTERACTION SYSTEM BETWEEN INFRASTRUCTURE AND MULTIPLE MOVING OBJECTS THROUGH SENSOR FUSION BASED INTERSECTION 3D SPACE CREATION AND INTERACTION METHOD USING THE SAME

CROSS-REFERENCE TO RELATED APPLICATIONS

This application claims priority to and the benefit of Korean Patent Application Nos. 10-2022-0115535, filed on Sep. 14, 2022, and 10-2022-0140846, filed on Oct. 28, 2022, the disclosure of which is incorporated herein by reference in its entirety.

BACKGROUND

1. Field of the Invention

The present invention relates to an interaction system between infrastructure and multiple moving objects through sensor fusion based intersection 3D space creation and an intersection method using the same.

2. Description of Related Art

According to the related art, in securing 2D or 3D data through Lidar, a camera, etc., there is a problem in that it is impossible to secure high-density 3D data due to an occlusion phenomenon between objects, and the like.

In the complex urban environment where the surrounding environment constantly changes, an autonomous driving system performs location recognition based on features of structures, but there are problems in that recognition accuracy is reduced or driving operation is impossible due to problems different from existing data.

In addition, due to physical characteristics of unidirectional sensors, when a phenomenon occurs that the unidirectional sensors are occluded by structures, illegally parked/stopped vehicles, etc., prediction of moving objects is delayed, which often leads to accidents.

SUMMARY

The present invention provides an interaction system and method capable of reducing a risk of an accident and solving a traffic accident problem caused by an occlusion phenomenon between objects through mutual action identification by recognizing the objects existing in a 3D space created by integrating multiple 3D data information acquired around an intersection and by creating/restoring location and shape information in a precise 3D space through interactions with infrastructure, autonomous vehicles, general vehicles, and pedestrians.

According to an embodiment of the present invention, an interaction system between infrastructure and multiple moving objects through sensor fusion based intersection 3D space creation includes: an infrastructure image sensor-based 3D cloud restoration module configured to create a 3D cloud point using a multi-view image received from an infrastructure sensor; a real-time 3D map creation and learning update module configured to generate subset data composed of point clouds into a 3D map using 3D point information received from the infrastructure image sensor-based 3D cloud restoration module; an object estimation module in a 3D space configured to recognize and track an object existing in a 3D space based on the 3D map received from the real-time 3D map creation and learning update module; and a dangerous situation recognition and interaction module in space configured to receive information on an object existing in the 3D space from the object estimation module in the 3D space, recognize a dangerous situation, and provide dangerous situation related information.

The infrastructure image sensor-based 3D cloud restoration module may estimate a depth image of the multi-view image, and generate and manage static 3D information and dynamic 3D information.

The real-time 3D map creation and learning update module may restore the 3D space by occlusion between objects using sensor data acquired and provided from various angles and locations to generate the 3D map.

The real-time 3D map creation and learning update module may generate the 3D map including sensor information existing in regional and global locations and extract a correlation data between 3D map subsets.

The real-time 3D map creation and learning update module may include: a first layer configured to extract features by matching a subset of 3D points with an image, regenerate multiple images input at the same time as multi-view, and extract feature information on a line; a second layer configured to generate a multi-view warped image using the image received from the first layer and extract the features; a third layer configured to calculate viewpoint information using GPS information and sensor location information and provide building and road property information included in a 3D navigation or a web map; a fourth layer configured to integrate multi-view 3D point cloud features, feature information on the line, and property information on the building and road; and a fifth layer configured to train 3D point cloud information and generate a subset 3D map.

An object estimation module in 3D space may be set a 3D space range for recognizing the correlation and the dangerous situation between the moving object and a geographical feature existing in the space and for interaction.

The object estimation module in 3D space may recognize and track an object using the integrated 3D point information received from the real-time 3D map creation and learning update module, recognize a type, a shape, and a state of the object, and confirm and manage the object existing in the restored 3D space based on the recognition result.

The dangerous situation recognition and interaction module in space may recognize a dangerous situation by using moving object information, road traffic related infrastructure information, and pedestrian information existing in the 3D space.

The dangerous situation recognition and interaction module in the space trains information on the dangerous situation and response related information.

According to another embodiment of the present invention, an interaction method between infrastructure and multiple moving objects through sensor fusion based intersection 3D space creation includes: (a) generating 3D cloud point information using an image received from an infrastructure sensor; (b) restoring a 3D space using the 3D cloud point information and creating a 3D map; (c) recognizing an object existing in space based on the 3D map; and (d) recognizing a dangerous situation using the object recognition result and providing dangerous situation related information to the object.

In the step (a), a depth image of a multi-view image may be estimated and the 3D cloud point information including static 3D information and dynamic 3D information may be generated.

In step (b), the 3D space by occlusion between objects may be restored using sensor data acquired and provided from various angles and locations.

In step (c), a 3D space range for recognizing a correlation between the moving object and a geographical feature existing in the space and the dangerous situation and for interaction may be set.

In step (d), a dangerous situation may be recognized by using moving object information, road traffic related infrastructure information, and pedestrian information existing in the 3D space.

DETAILED DESCRIPTION

The above-described aspect, and other aspects, advantages, and features of the present disclosure and methods accomplishing them will become apparent from the following detailed description of exemplary embodiments with reference to the accompanying drawings.

However, the present invention may be modified in many different forms and it should not be limited to the exemplary embodiments set forth herein, and only the following embodiments are provided to easily inform those of ordinary skill in the art to which the present invention pertains the objects, configurations, and effects of the present invention, and the scope of the present invention is defined by the description of the claims.

Meanwhile, terms used in the present specification are for explaining exemplary embodiments rather than limiting the present invention. Unless otherwise stated, a singular form includes a plural form in the present specification. "Comprises" and/or "comprising" used in the present invention indicate(s) the presence of stated components, steps, operations, and/or elements but do(es) not exclude the presence or addition of one or more other components, steps, operations, and/or elements.

The J3016 standard of the International Association of Automotive Engineers classifies autonomous driving levels. Domestic and foreign automobile companies are currently mass-producing level 2 or level 3 semi-autonomous vehicles, and are continuously conducting research and development to cope with various road environments and situations. In addition, many large corporations and IT start-ups are also conducting research to expand the scope of autonomous driving-related technologies and secure technologies corresponding to level 3 or level 4.

In order to cope with various situations such as complex general roads and intersections, there is a need to link information to be recognized and to solve problems related to shadow recognition zones by using a larger number of sensors.

The present invention focuses on the need to secure stable and safe autonomous driving technology in a more complex road environment as the autonomous driving level improves, and proposes an artificial intelligence technology that enables interaction through information sharing between moving objects including infrastructure and vehicles.

According to an embodiment of the present invention, an adaptive precision map is created through sensor data fusion provided by the infrastructure, and the integrated results are continuously updated.

According to an embodiment of the present invention, by recognizing locations and state information of vehicles and moving objects included in a real-time integrated 3D space and transmitting situation analysis information to the corresponding moving object from an omniscient point of view of an infrastructure integration system through mutual information sharing, it provides support to a level that defensive driving is possible at intersections or complex environments.

Hereinafter, in the detailed description of the present invention, 1) infrastructure image sensor-based 3D cloud restoration, 2) real-time 3D map creation/learning update, 3) object estimation in 3D space, 4) dangerous situation recognition and interaction in space will be described.

1. 3D Cloud Restoration Method Based on Infrastructure Image Sensor

Figure 1A:
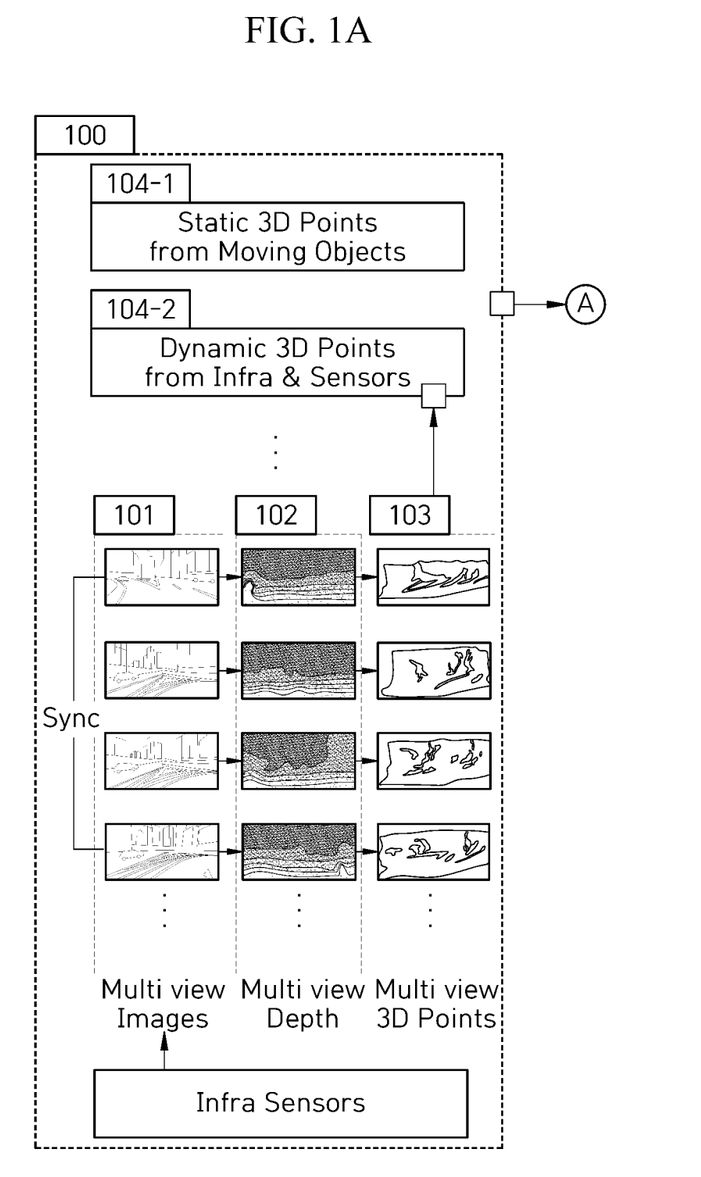
FIGS. 1A to 1C are diagrams illustrating a structure of an interaction system through 3D map creation and object context recognition in a 3D space according to an embodiment of the present invention.

An infrastructure image sensor-based 3D cloud restoration module 100 includes a multi-mono image input unit 101 that receives a multi-view image from the infrastructure sensor, an estimator 102 that estimates a depth image of a multi-mono image, and a generation unit 103 that generates a 3D cloud point.

The infrastructure image sensor-based 3D cloud restoration module 100 generates and manages static 3D information 104-1 existing in a space in which a 3D space is restored based on a plurality of pieces of subset information, and generates and manages dynamic 3D information 104-2 on moving objects or movable objects existing in the same space, according to generation and synchronization of 3D cloud points.

The static 3D information 104-1 and the dynamic 3D information 104-2 generated by the infrastructure image sensor-based 3D cloud restoration module 100 are provided to a real-time 3D map creation and learning update module at a data level including two properties in previous stages of recognition/integration/classification.

2. Real-Time 3D Map Creation and Learning Update Method

Figure 1B:
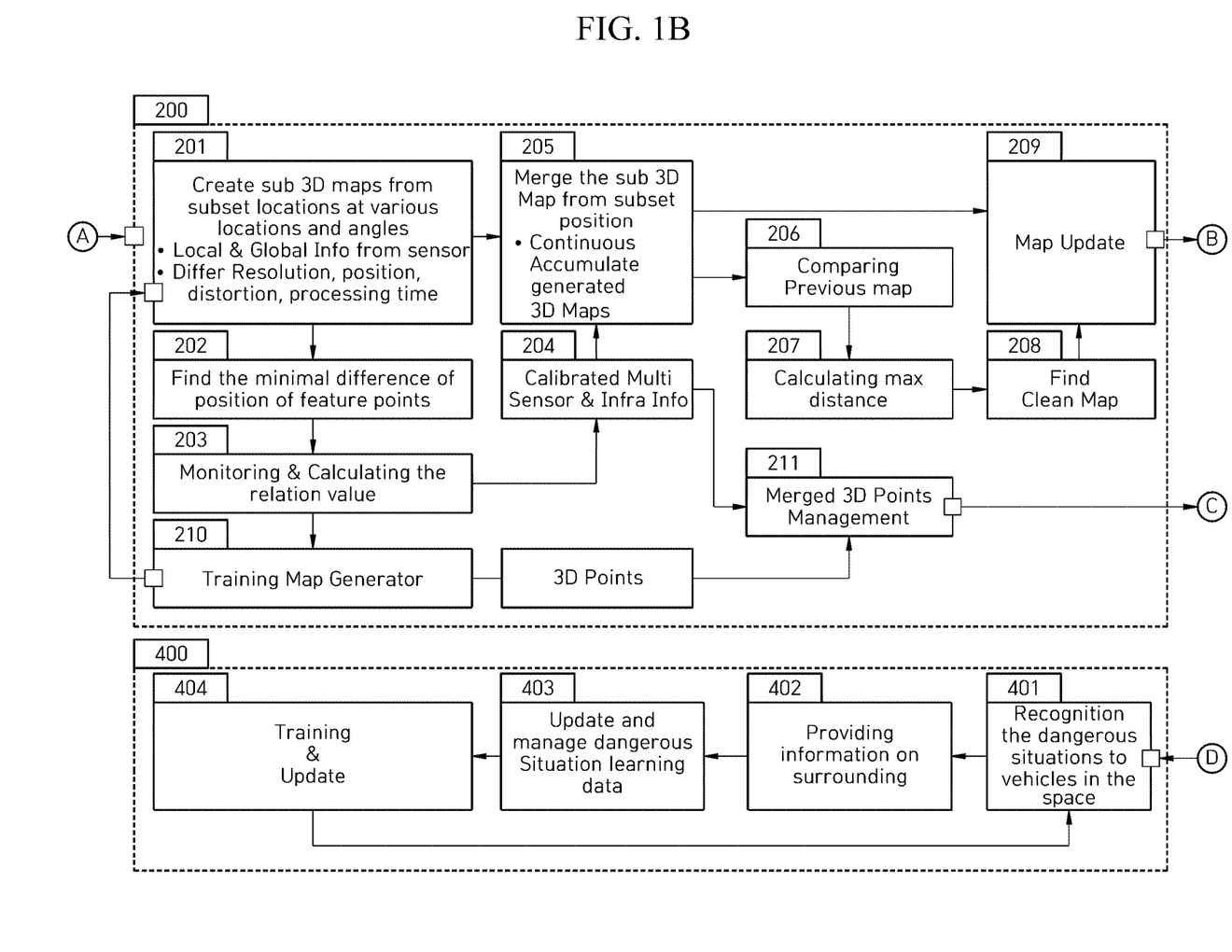

The real-time 3D map creation and learning update module 200 receives the synchronized 3D point information received from the infrastructure image sensor-based 3D cloud restoration module 100 in real time, and generates subset data composed of each point cloud into the 3D map. The real-time 3D map creation and learning update module 200 creates the 3D map, and then extracts and compares difference and feature information from the previous map, and actively performs the map update.

The real-time 3D map creation and learning update module 200 performs 3D space restoration on an occluded part through multi-view and sensor data provided from various locations, and creates and continuously updates the 3D map.

The sub-map creation unit 201 creates a subset of 3D point clouds acquired from various locations and angles into a 3D map, and the 3D map includes sensor information that exists at local and global locations, as well as different resolutions, locations, distortions, and processing speed properties.

The feature extraction unit 202 compares previous and current data using the information received from the sub-map creation unit 201, extracts features, and transmits the extracted features to the correlation extraction unit 203.

The correlation extraction unit 203 extracts correlation data between 3D map subsets calculated through real-time monitoring.

A calibration unit 204 derives calibration values between 3D location information of regional and global infrastructures outputting 3D point information and multiple sensors to calculate correlation information.

The learning map generation unit 210 receives and manages subset data generated as a 3D map in real time, generates learning data, updates the learned result to the sub-map creation unit 201, and creates the evolved 3D sub-map.

A merging unit 205 uses the 3D sub-map information provided from the sub-map creation unit 201 to generate one integrated 3D map. The generated 3D map extracts features that have a correlation with the existing 3D map through a feature extraction unit 202, a correlation extraction unit 203, and a calibration unit 204, and the continuously calculated results are accumulated.

The comparison unit 206 compares the 3D map accumulated by the merging unit 205 with previous information to extract features, and the calculation unit 207 calculates the difference between the 3D map and the previous information to determine a part to be removed and added. A final 3D map derivation unit 208 performs optimization using the part to be removed and added, and derives a final organized 3D map.

A map update unit 209 newly updates a map that has a difference from the previous one by using the performance results of the comparison unit 206, the calculation unit 207, and the final 3D map derivation unit 208, and updates the information of the merging unit 205 to effectively use the amount of computation when there is no difference.

A 3D point subset integration unit 211 integrates the calibration information including the correlation information calculated by the calibration unit 204 and the 3D point subset managed when generating the 3D map.

Figure 2A:
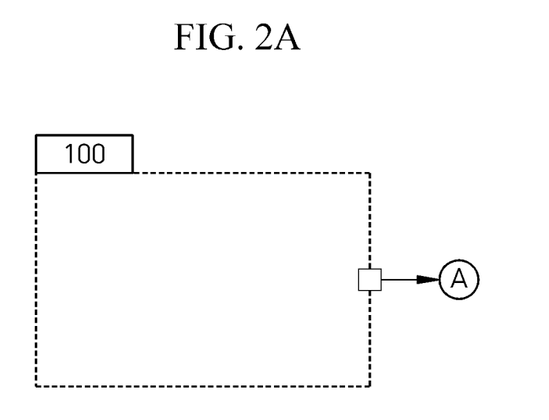
FIGS. 2A and 2B are diagrams illustrating subset 3D map creation according to an embodiment of the present invention.
Figure 2B:
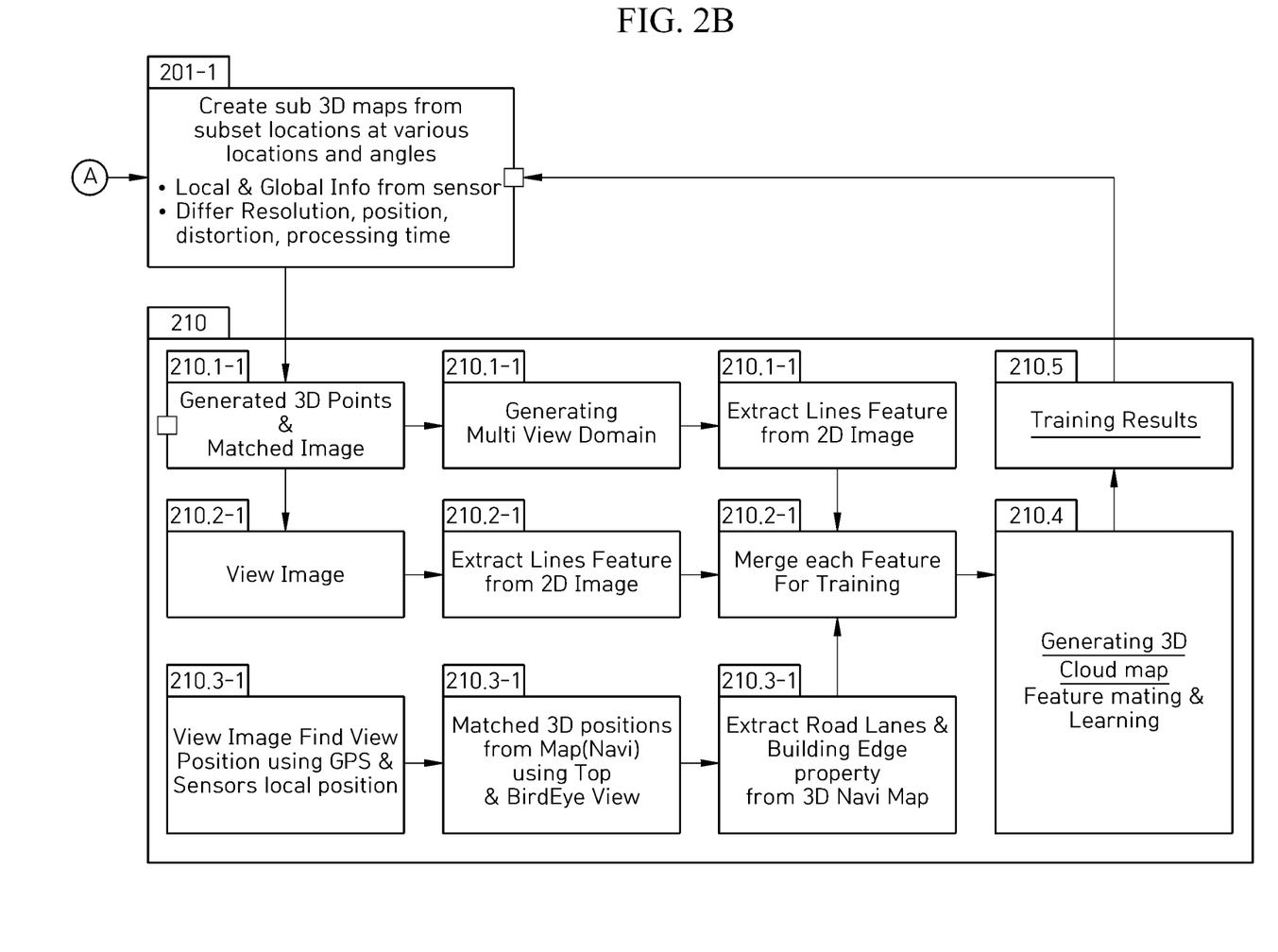
Figure 3:
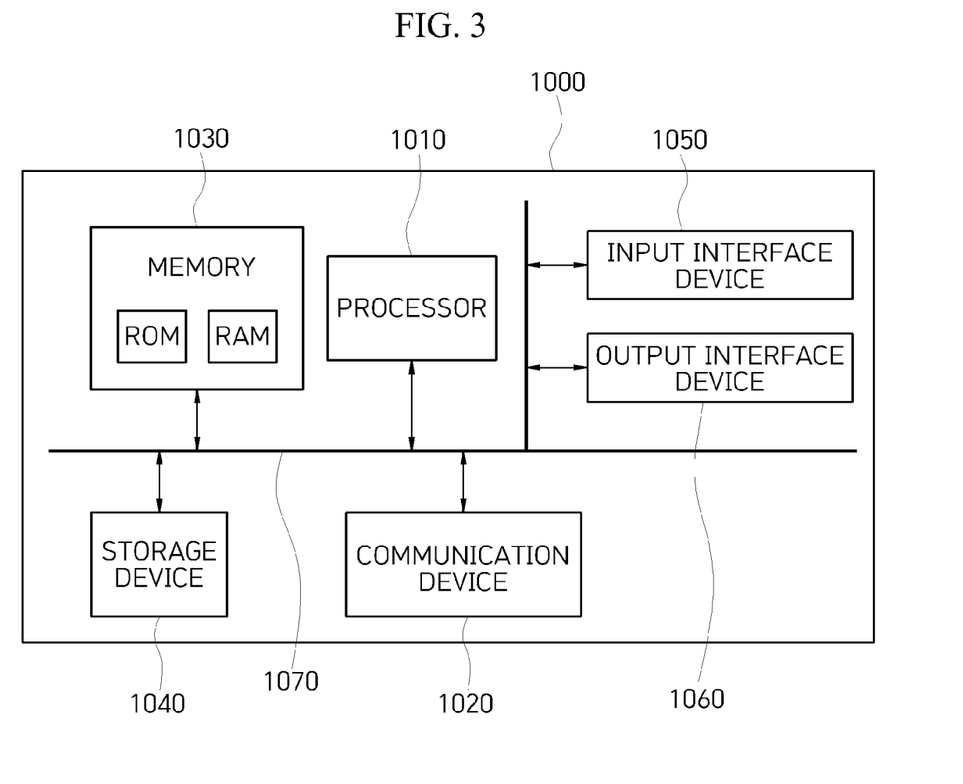
FIG. 3 is a block diagram illustrating a computer system for implementing the method according to the embodiment of the present invention.

FIGS. 2A and 2B are diagrams illustrating subset 3D map creation according to an embodiment of the present invention.

Referring to FIGS. 2A and 2B, a network structure for 3D map generation, feature information extraction, and learning of the learning map generation unit 210 will be described.

A first layer 210.1-1 extracts features by matching a subset of each synchronized 3D point with a corresponding image, regenerates several multiple images, which are input at the same time, in multiple views, and extracts feature information on lines from multi-view 3D point images projected in 2D.

A second layer 210.2-1 receives an image from the first layer 210.1-1, generates a multi-view warped image, and extracts features.

A third layer 210.3-1 calculates view information using GPS information and sensor location information, estimates 3D location information using bird's eye view, navigation and web map information, and provides property information on buildings and roads included in the 3D navigation or web map to a fourth layer 210.4.

The fourth layer 210.4 is a layer that integrates, in a backbone layer, a multi-view 3D point cloud feature projected to the provided 2D image domain, line information extracted from a 2D real image matching the multi-view 3D point cloud feature, and properties of the 3D navigation or the web maps and the location information of actual sensors in the 3D space.

A fifth layer 210.5 is a layer that trains 3D point cloud information that matches properties of the currently created map information with the 3D map based on the information output through the fourth layer 210.4, and extracts previous map information and features to create a subset 3D map.

The training result that may generate the 3D map output from the fifth layer 210.5 is provided to the sub-map generation layer 201-1 to generate a 3D map subset using the 3D point cloud information input in real time.

3. Object Estimation in 3D Space

Figure 1C:
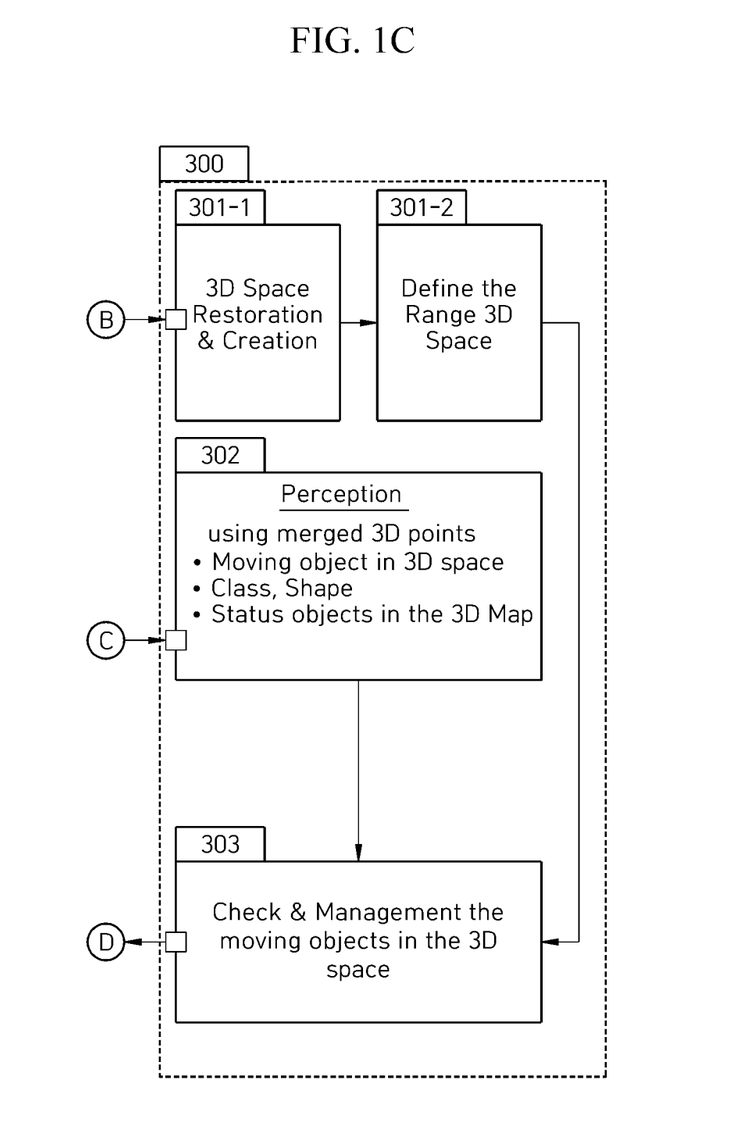

An object estimation module 300 in a 3D space defines intersections and major complex hub spaces based on a final updated 3D map, which is received from the map update unit 209 and is composed of topography and road infrastructure after object information has been removed.

A 3D space restoration unit 301-1 restores and generates a 3D space composed of a 3D map.

A 3D space definition unit 301-2 sets a range of a 3D space restored and generated by the 3D space restoration unit 301-1. The 3D space definition unit 301-2 recognizes a correlation and a dangerous situation for moving objects and geographical features existing in a space, and sets a space range for the purpose of setting a limited range for interaction.

A recognition unit 302 receives integrated 3D point information from the 3D point subset integration unit 211, recognizes and tracks the configured object, and recognizes the type, shape, and state.

An object confirmation unit 303 confirms and manages objects existing in the restored 3D space based on the objects recognized by the recognition unit 302 and information between the objects in real time.

4. Dangerous Recognition and Interaction Method in Space

A dangerous situation recognition and interaction module 400 in space performs an interaction function of receiving object information existing in the 3D space provided by the object confirmation unit 303, using correlation between objects, traffic light, and traffic system information to recognize dangerous situations, and providing information to each moving object and pedestrian (user) to recognize dangerous situations in advance and perform accident prevention.

The dangerous situation recognition unit 401 recognizes dangerous situations according to mutual actions and location situations by using moving objects existing in the 3D space, road traffic related infrastructure information, and pedestrian and user information received from the object confirmation unit 303.

The information providing unit 402 finds, in a 3D space, a location of an object existing at a point related to the dangerous situation recognized by the dangerous situation recognition unit 401, and provides response-related information to objects that cause illegal and dangerous situations and objects that will encounter the dangerous situations.

A learning data storage management unit 403 stores and manages feedback information and situation information on a situation, which can be dealt with, as learning data based on information on the dangerous situations provided from the information providing unit 402.

A training and update unit 404 periodically trains and updates the situation data and dangerous situation recognition data received from the learning data storage management unit 403, and provides the training result to the dangerous situation recognition unit 401 to improve situation awareness performance.

According to the present invention, by restoring a 3D space and recognizing a correlation between objects in the space, it is possible to prevent in advance a dangerous situation that occurs when a view is occluded by surrounding vehicles or a driver is not aware of it.

According to the present invention, by continuously updating a plurality of 3D data provided by infrastructure to obtain more accurate and precise map data of a specific region and monitoring traffic conditions of not only autonomous vehicles but also all objects included in the corresponding 3D space, it is possible to secure safety by providing accident risk information.

According to the present invention, it is possible to actively and preemptively respond to accidents caused by traffic violation vehicles at intersections, and to support coping with pedestrians crossing illegally by appearing in crosswalks and complex illegal parking/stopping areas.

The effects of the present invention are not limited to those mentioned above, and other effects not mentioned can be clearly understood by those skilled in the art from the following description.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An interaction system between infrastructure and multiple moving objects through sensor fusion based intersection 3D space creation, the interaction system comprising:
    an infrastructure image sensor-based 3D cloud restoration module configured to create a 3D cloud point using a multi-view image received from an infrastructure sensor;
    a real-time 3D map creation and learning update module configured to generate subset data composed of point clouds into a 3D map using 3D point information received from the infrastructure image sensor-based 3D cloud restoration module;
    an object estimation module in a 3D space configured to recognize and track an object existing in a 3D space based on the 3D map received from the real-time 3D map creation and learning update module; and
    a dangerous situation recognition and interaction module in space configured to receive information on an object existing in the 3D space from the object estimation module in a 3D space, recognize a dangerous situation, and provide dangerous situation related information,
    wherein the real-time 3D map creation and learning update module restores the 3D space by occlusion between objects using sensor data acquired and provided from various angles and locations to generate the 3D map,
    wherein the real-time 3D map creation and learning update module generates the 3D map including sensor information existing in regional and global locations and extracts a correlation data between 3D map subsets,
    wherein the real-time 3D map creation and learning update module includes:
    a first layer configured to extract features by matching a subset of 3D points with an image, regenerate multiple images input at the same time as multi-view, and extract feature information on a line;
    a second layer configured to generate a multi-view warped image using the image received from the first layer and extract the features;
    a third layer configured to calculate viewpoint information using GPS information and sensor location information and provide building and road property information included in a 3D navigation or a web map;
    a fourth layer configured to integrate multi-view 3D point cloud features, feature information on the line, and property information on the building and road; and
    a fifth layer configured to train 3D point cloud information and generate a subset 3D map.

2. The interaction system of claim 1, wherein the infrastructure image sensor-based 3D cloud restoration module estimates a depth image of the multi-view image, and generates and manages static 3D information and dynamic 3D information.

3. The interaction system of claim 1, wherein the object estimation module in 3D space sets a 3D space range for recognizing the correlation and the dangerous situation between the moving object and a geographical feature existing in the space and for interaction.

4. The interaction system of claim 3, wherein the object estimation module in 3D space recognizes and tracks an object using the integrated 3D point information received from the real-time 3D map creation and learning update module, recognizes a type, a shape, and a state of the object, and confirms and manages the object existing in the restored 3D space based on a recognition result.

5. The interaction system of claim 1, wherein the dangerous situation recognition and interaction module in space recognizes a dangerous situation by using moving object information, road traffic related infrastructure information, and pedestrian information existing in the 3D space.

6. The interaction system of claim 5, wherein the dangerous situation recognition and interaction module in space trains information on the dangerous situation and response related information.

* * * * *